US009179223B2

(12) United States Patent
Van Der Werf et al.

(10) Patent No.: US 9,179,223 B2
(45) Date of Patent: Nov. 3, 2015

(54) AUDIO SYSTEM WITH FEEDBACK CANCELLATION

(75) Inventors: Erik Cornelis Diederik Van Der Werf, Eindhoven (NL); Nikolai Bisgaard, Kgs. Lyngby (DK)

(73) Assignee: GN RESOUND A/S, Ballerup (DK)

( * ) Notice: Subject to any disclaimer, the term of this patent is extended or adjusted under 35 U.S.C. 154(b) by 1176 days.

(21) Appl. No.: 12/937,251

(22) PCT Filed: Apr. 8, 2009

(86) PCT No.: PCT/DK2009/000089
§ 371 (c)(1), (2), (4) Date: Dec. 27, 2010

(87) PCT Pub. No.: WO2009/124550
PCT Pub. Date: Oct. 15, 2009

(65) Prior Publication Data

US 2011/0103613 A1 May 5, 2011

Related U.S. Application Data

(60) Provisional application No. 61/043,991, filed on Apr. 10, 2008.

(30) Foreign Application Priority Data

Apr. 10, 2008 (DK) ................................ 2008 00525

(51) Int. Cl.
*H04B 15/00* (2006.01)
*H04R 25/00* (2006.01)
*H04R 3/02* (2006.01)

(52) U.S. Cl.
CPC ................ *H04R 25/453* (2013.01); *H04R 3/02* (2013.01)

(58) Field of Classification Search
CPC ........ H04R 25/453; H04R 3/02; H04R 25/45; H04M 9/082; G10L 2021/02082; H04S 2420/01
USPC ............. 381/93, 122, 96, 120, 318, 317, 312, 381/71.11, 71.8, 71.1, 71.12, 71.14, 104, 381/321
See application file for complete search history.

(56) References Cited

U.S. PATENT DOCUMENTS 5,619,580 A 4/1997 Hansen
5,680,467 A 10/1997 Hansen (Continued)

FOREIGN PATENT DOCUMENTS

EP 1708543 4/2006
EP 1898670 3/2008

(Continued)

OTHER PUBLICATIONS

International Search Report and Written Opinion mailed Sep. 19, 2009 for PCT/DK2009/000089.
Jain et al.: "Data Clustering: A review". ACM Computing Surveys, ACM, New York, NY. vol. 31, No. 3, Sep. 1, 1999, pp. 264-323, XP002165131.
Danish Office Action dated Oct. 22, 2008 for Application No. PA 2008 00525.

(Continued)

*Primary Examiner* — Vivian Chin
*Assistant Examiner* — Con P Tran
(74) *Attorney, Agent, or Firm* — Vista IP Law Group, LLP

(57) ABSTRACT

An audio system includes a signal processor for processing an audio signal, and a feedback suppressor circuit configured for modelling a feedback signal path of the audio system by provision of a feedback compensation signal based on sets of feedback model parameters for the feedback signal path that are stored in a repository.

43 Claims, 10 Drawing Sheets

(56) References Cited

U.S. PATENT DOCUMENTS

Figure 1:
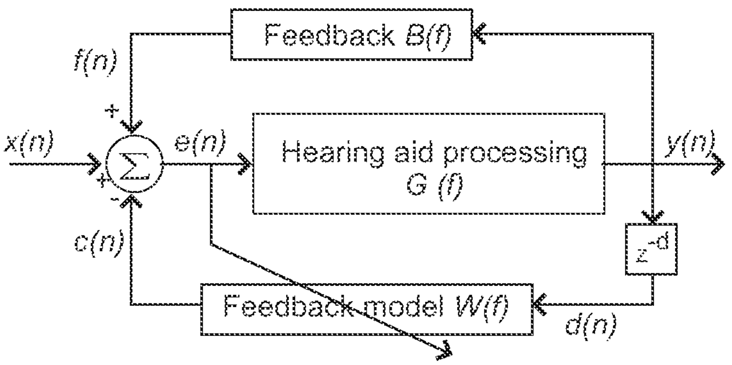
(PRIOR ART) Fig. 1

| | | | | |
|---|---|---|---|---|
| 6,498,858 | B2 | 12/2002 | Kates | |
| 6,990,193 | B2 | 1/2006 | Beaucoup et al. | |
| 2001/0055985 | A1 | 12/2001 | Matt et al. | |
| 2004/0125966 | A1 | 7/2004 | Weidner | |
| 2005/0047609 | A1 | 3/2005 | Buchner | |
| 2007/0206824 | A1 * | 9/2007 | Hellgren et al. | 381/313 |
| 2007/0217620 | A1 | 9/2007 | Zhang | |
| 2007/0217639 | A1 * | 9/2007 | Stirnemann | 381/321 |
| 2008/0212816 | A1 * | 9/2008 | Pedersen et al. | 381/318 |

FOREIGN PATENT DOCUMENTS

| | | |
|---|---|---|
| JP | 11205890 | 7/1999 |
| WO | 2007037029 | 4/2007 |
| WO | 2007053896 | 5/2007 |

OTHER PUBLICATIONS

International Type Search Report dated Jan. 30, 2009 for DK 200800525.

English Abstract of JP 11205890.

English Abstract of JP 01024696.

J. MacQueen, "Some Methods for Classification and Analysis of Multivariate Observations", 5-th Berkeley Symposium on Mathematical Statistics and Probability, 1967, pp. 281-297, vol. 1, University of California Press, Berkeley.

Allou Same et al., "A Mixture Model Approach for On-Line Clustering", Symposium in Compstat, 2004, pp. 1-7, Prague, Czech Republic.

Carl Edward Rasmussen, "The Infinite Gaussian Mixture Model", Advances in Neural Information Processing Systems 12, 2000, pp. 554-560, MIT Press.

Notification of Reexamination dated Apr. 27, 2015, for corresponding Chinese Patent Application No. 200980120548.7, 15 pages.

* cited by examiner

AUDIO SYSTEM WITH FEEDBACK CANCELLATION

PRIORITY DATA

This application is the national stage of International Application No. PCT/DK2009/000089, filed on Apr. 8, 2009, now pending, which claims priority to and the benefit of U.S. Provisional Patent Application No. 61/043,991, filed on Apr. 10, 2008, and Danish Patent Application No. PA 2008 00525, filed on Apr. 10, 2008, now abandoned, the entireties of all of which are expressly incorporated by reference herein.

FIELD

The application relates to an audio system, such as a hearing aid, a communication system (including but not limited to, a teleconference system, an intercom system, etc.), etc., with feedback cancellation. The feedback cancellation may include echo cancellation, cancellation of acoustic feedback signals, cancellation of mechanically coupled feedback signals, cancellation of electromagnetically coupled feedback signals, etc.

BACKGROUND

Feedback is a well known problem in audio systems and several systems for suppression or cancellation of feedback exist within the art. With the development of very small digital signal processing (DSP) units, it has become possible to perform advanced algorithms for feedback suppression in a tiny device such as a hearing instrument, c.f. e.g. U.S. Pat. No. 5,619,580; U.S. Pat. No. 5,680,467; and U.S. Pat. No. 6,498,858.

The above mentioned prior art systems for feedback cancellation in hearing aids are all primarily concerned with the problem of external feedback, i.e. transmission of sound between the loudspeaker (often denoted receiver) and the microphone of the hearing aid along a path outside the hearing aid device. This problem, which is also known as acoustical feedback, occurs e.g. when a hearing aid ear mould does not completely fit the wearer's ear, or in the case of an ear mould comprising a canal or opening for e.g. ventilation purposes. In both examples, sound may "leak" from the receiver to the microphone and thereby cause feedback.

However, feedback in a hearing aid may also occur internally as sound can be transmitted from the receiver to the microphone via a path inside the hearing aid housing. Such transmission may be airborne or caused by mechanical vibrations in the hearing aid housing or some of the components within the hearing instrument. In the latter case, vibrations in the receiver are transmitted to other parts of the hearing aid, e.g. via the receiver mounting(s). For this reason, the receiver is not fixed but flexibly mounted within some state-of-the-art hearing aids of the ITE-type (In-The-Ear), whereby transmission of vibrations from the receiver to other parts of the device is reduced.

Typically, feedback suppression or cancellation circuits utilise one or more adaptive filters. The adaptive filter performance is a trade-off between low steady-state error and sufficient ability to track changes. Thus, under steady-state conditions the performance is sub-optimal since the adaptive filter should be capable of adapting to a sudden change, while in dynamic situations the performance is sub-optimal because the tracking is slow.

SUMMARY

It is an object to provide an audio system with feedback cancellation with an improved trade-off between low steady-state error and fast tracking.

According to some embodiments, the above-mentioned and other objects are fulfilled by an audio system comprising a signal processor for processing an audio signal, and a feedback suppressor circuit configured for modelling a feedback signal path of the audio system by provision of a feedback compensation signal based on sets of feedback model parameters for the feedback signal path that are stored in a repository for storage of the sets of feedback model parameters.

In one embodiment, the audio system comprises a hearing aid with a microphone for converting sound into an audio signal, the signal processor for processing the audio signal, and a receiver that is connected to an output of the signal processor for converting the processed audio signal into a sound signal. The hearing aid further includes the feedback suppressor circuit configured for modelling a feedback signal path of the hearing aid by provision of the feedback compensation signal based on sets of feedback model parameters for the feedback signal path that are stored in the repository for storage of the sets of feedback model parameters.

In a conventional feedback cancellation circuit with one or more adaptive filters, the filter coefficients of the adaptive filter(s) are adjusted in accordance with an algorithm that strives to minimize an error function. Thus, when a feedback signal path of the audio system has been stable for some time, the filter coefficients will reach substantially constant values that correspond to the current feedback signal path. However, when the feedback signal path changes, the algorithm changes the filter coefficients in order to adapt the filter coefficients to the new feedback path and thus, the set of filter coefficients corresponding to the previous stable feedback signal path is lost. Hence, if this feedback signal path occurs again, the corresponding filter coefficients have to be recalculated by repeated adaptation.

In an embodiment, previous sets of filter coefficients corresponding to respective feedback signal paths are stored in the repository. When one of the feedback signal paths recurs, the corresponding set of filter coefficients is loaded into a digital filter or another digital signal processing circuit that provides the feedback compensation signal.

As further explained below, a detector may be provided for detecting whether a previous feedback signal path is recurring, for example including an environment detector and an environment classifier indicating whether or not the set of feedback model parameters currently used by the feedback suppressor circuit for provision of the feedback compensation signal should be replaced by another set from the repository.

In general, according to some embodiments, previous sets of feedback model parameters corresponding to respective feedback signal paths are stored in the repository. When one of the feedback signal paths recurs, the corresponding set of feedback model parameters is used by the feedback suppressor circuit that provides the feedback compensation signal.

In this way, the feedback suppressor circuit provided exhibits low steady-state error in combination with fast transient response in response to a change of the feedback signal path.

Some or all sets of feedback model parameters stored in the repository may be updated during normal use of the audio system.

Some or all sets of feedback model parameters, e.g. sets of filter coefficients of a digital filter, e.g. an adaptive digital filter, stored in the repository, may correspond to frequently occurring feedback signal paths for which feedback model parameters may be obtained and updated during normal use of the audio system.

Some or all sets of feedback model parameters may be obtained during a learning period of the audio system.

Some or all sets of feedback model parameters may be obtained by other equipment and subsequently entered into the repository, for example during manufacture of the audio system.

For example, in an embodiment, the audio system comprises a hearing aid with a repository for storing a plurality of sets of feedback model parameters. The repository holds a plurality of sets of feedback model parameters and is operatively connected to the feedback suppressor circuit for transfer of a selected set of feedback model parameters from the repository to the feedback suppressor circuit. In one embodiment, the feedback suppressor circuit also has a fast adaptive filter for modelling the current acoustic feedback path of the hearing aid and its filter coefficients constitute the feedback model parameters. Sets of filter coefficients corresponding to respective stable feedback signal paths are stored in the repository. When a sudden change of the feedback signal path occurs, e.g. when the user brings a phone handset close to the hearing aid, a suitable set of filter coefficients corresponding to the feedback path of that situation is selected from the repository. The selected set of feedback model parameters is then entered into the feedback suppressor circuit for provision of the feedback compensation signal. The feedback compensation signal may for example be provided by a digital filter with filter coefficients constituted by the selected set of feedback model parameters. The digital filter may be an adaptive filter with low steady-state error wherein the selected set of feedback model parameters is loaded into the adaptive filter and forms a new starting point for the further adaptation, whereby the transient properties of the adaptive filter becomes of minor importance to the performance of the feedback suppressor circuit.

As already mentioned, the repository may include sets of feedback model parameters that remain unchanged during normal use of the audio system. In a hearing aid, such feedback model parameters may be entered into the repository when the hearing aid is fitted to the user by a hearing aid dispenser. Some or all of the stored sets of feedback model parameters may be standard sets of feedback model parameters, which have been found to work well for the type of hearing aid in question.

Some of the stored sets of feedback model parameters may be determined during fitting of the hearing aid. For example during fitting, a number of sets of feedback model parameters may be available for modelling the physical feedback path of one or more different situations, such as a situation where the user makes use of a mobile phone, which is placed close to the ear. During fitting, the most suitable sets of feedback model parameters are selected from the available sets for the actual hearing aid and user and the selected sets are stored in the repository.

The repository may include a plurality of sets of feedback model parameters, which are updated during operation of the audio system. The updating and storing of sets of feedback model parameters during use of the audio system may for example be performed using cluster based learning techniques as described in the following.

Further, the system may comprise a user interface allowing the user to command the system to store a current set of feedback model parameters in the repository, e.g. when an object, such as a mobile phone, a neck rest of a chair, a child, a side window of a car, etc., is placed close to the ear of a user of a hearing aid. When the user perceives that the system has attained optimum performance in such a situation, the user may command the system, e.g. by pressing a push button, to store the present set of feedback model parameters, or a set of feedback model parameters derived there from, in the repository. The audio system may further be configured for evaluation of the set of feedback model parameters to be stored in the repository and for storing the set of feedback model parameters only when certain criteria are fulfilled, for example that the variation of the values of the set of feedback model parameters remain below a certain threshold or fulfil other quality measures.

In addition to the sets of feedback model parameters, the system may also store other information identifying the current feedback path. Subsequently, the system can use this information to determine when a similar feedback path occurs and locate and retrieve the set of feedback model parameters to be used for provision of the feedback compensation signal, for example as a starting point for further adaptation.

A detector may be provided for detecting whether or not the set of feedback model parameters currently used by the feedback suppressor circuit for provision of the feedback compensation signal should be replaced by another set from the repository, and if so, the detector may further be configured for selecting the set of feedback model parameters to be used from the sets of feedback model parameters stored in the repository.

The detector may for example be a phone detector, such as a magnetic phone detector configured for detecting the presence of a phone in the proximity of the user's ear. A permanent magnet may be positioned on the mobile phone, and the detector may be configured to detect the presence of the magnet, or, the detector may be adapted for detecting the presence of a magnetic field generated by the speaker of a mobile phone.

The detector may comprise one or more proximity sensors configured for detecting whether or not an object which may influence the feedback path of the audio system is present. When such an object is detected, a suitable set of feedback model parameters is selected from the repository for use by the feedback processor circuit for provision of the feedback compensation signal.

The detector may be configured for detecting changes in the feedback path of the audio system thereby detecting situations in which the set of feedback model parameters currently used by the feedback suppressor circuit may be substituted by another set of feedback model parameters from the repository.

The detector may comprise an environment detector configured for detecting the environment of the audio system, for example the acoustic environment of a hearing aid. The detector may further comprise an environment classifier, for example classifying an acoustical environment of a hearing aid as speech, noise, speech in quiet surroundings, speech in noisy surroundings, babble noise, traffic noise and/or other types of acoustic situations. In a hearing aid, the environment classification may cause a program shift in the signal processor whereby the signal processing may change abruptly. For example, a hearing aid may be able to shift between various programs where different signal processing, such as directionality, noise reduction, etc., are employed and different components may be used, e.g. the hearing aid may or may not make use of a telecoil. Such abrupt change of the signal processing in a hearing aid may also change the feedback path abruptly due to the change of the transfer function of the hearing aid. For example, when executing one signal processing programme, the hearing aid may be closer to an unstable situation than when executing another signal processing programme. The feedback suppressor circuit may further be configured for determining a set of feedback model parameters based on the detected environment and the sets of feedback model parameters stored in the repository for modelling the feedback signal path corresponding to the detected environment.

In a preferred embodiment, the hearing aid further comprises a first subtractor for subtracting the feedback compensation signal from the audio signal to form a compensated audio signal supplied to the signal processor.

In some embodiments, an audio system includes a signal processor for processing an audio signal, and a feedback suppressor circuit configured for modelling a feedback signal path of the audio system by provision of a feedback compensation signal based on sets of feedback model parameters for the feedback signal path that are stored in a repository.

DESCRIPTION OF THE DRAWING FIGURES

Figure 2:
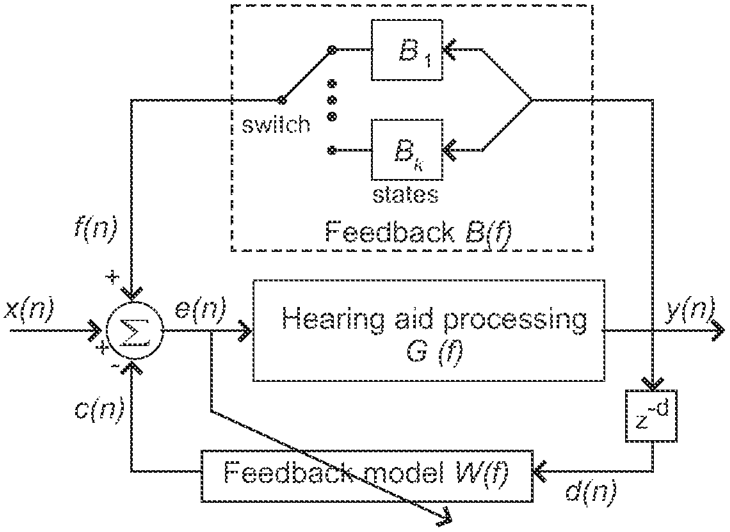
(PRIOR ART) Fig. 2
Figure 3:
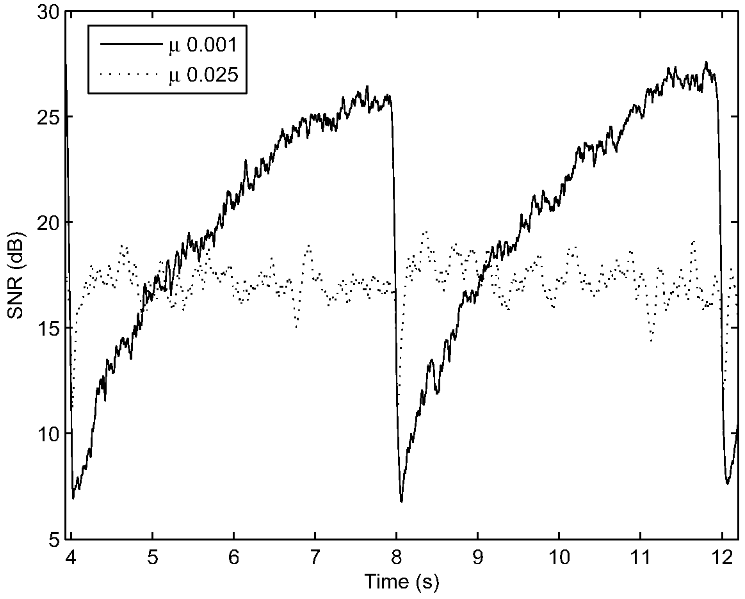
(PRIOR ART) Fig. 3
Figure 4:
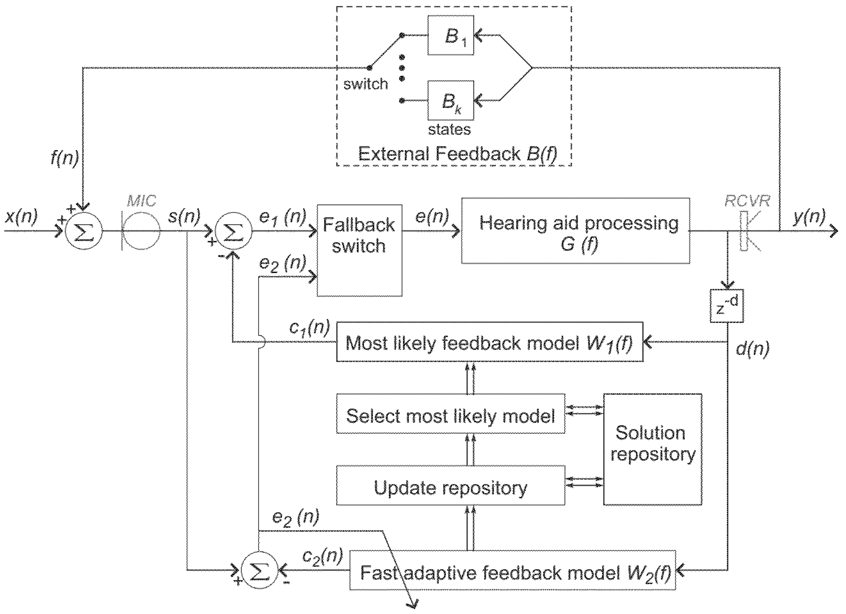
Figure 5:
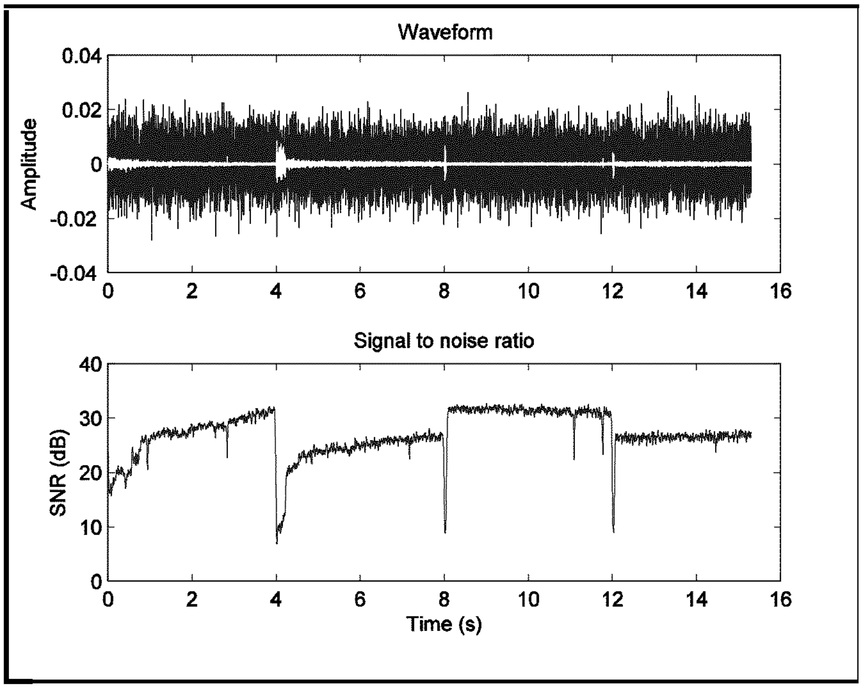
Figure 6:
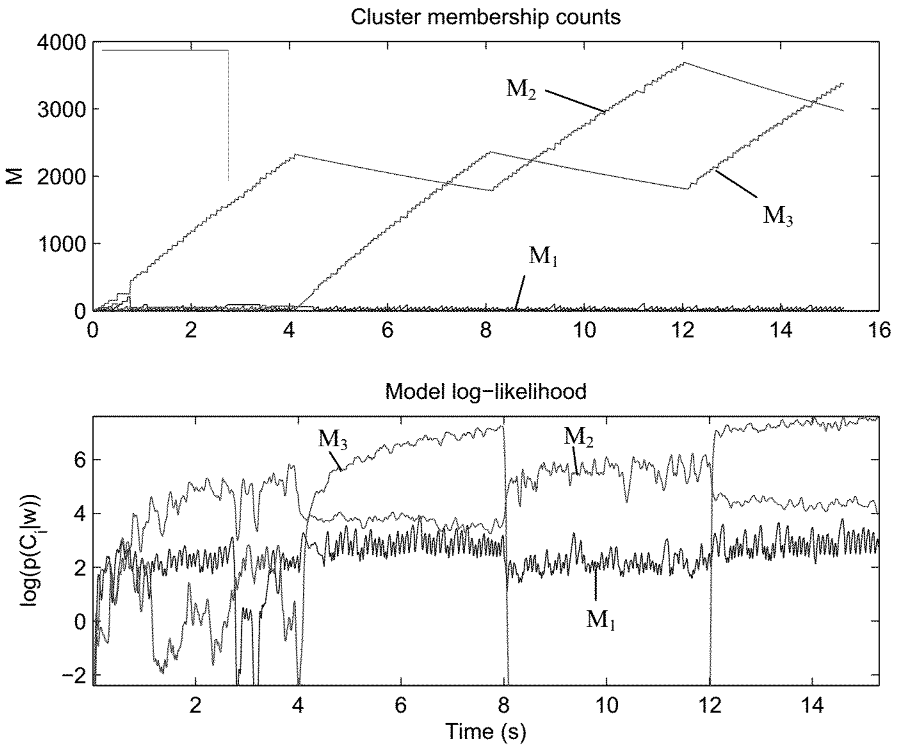
Figure 7:
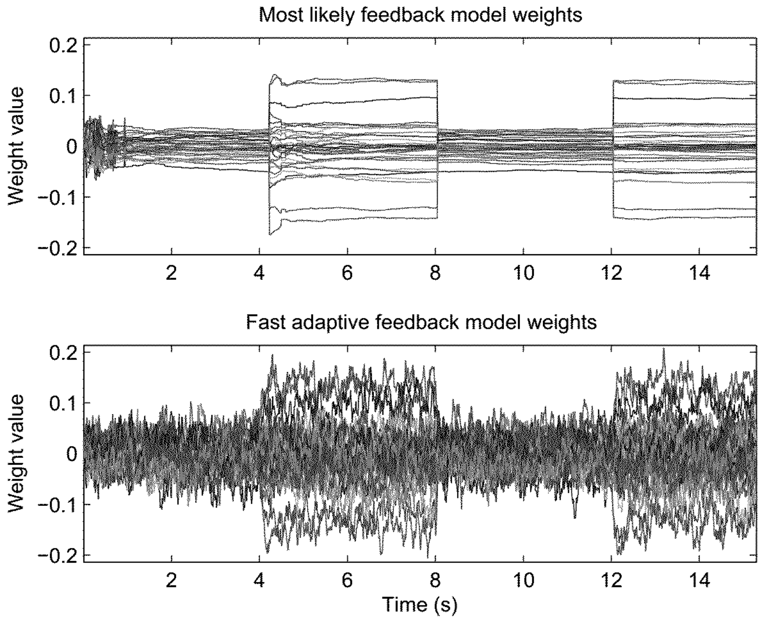
Figure 8:
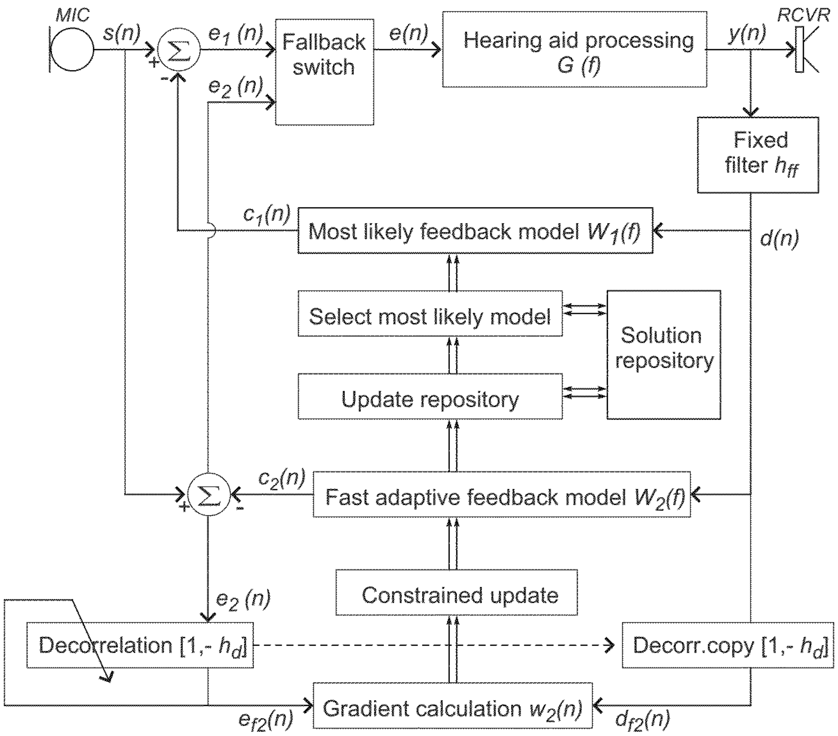
Figure 9:
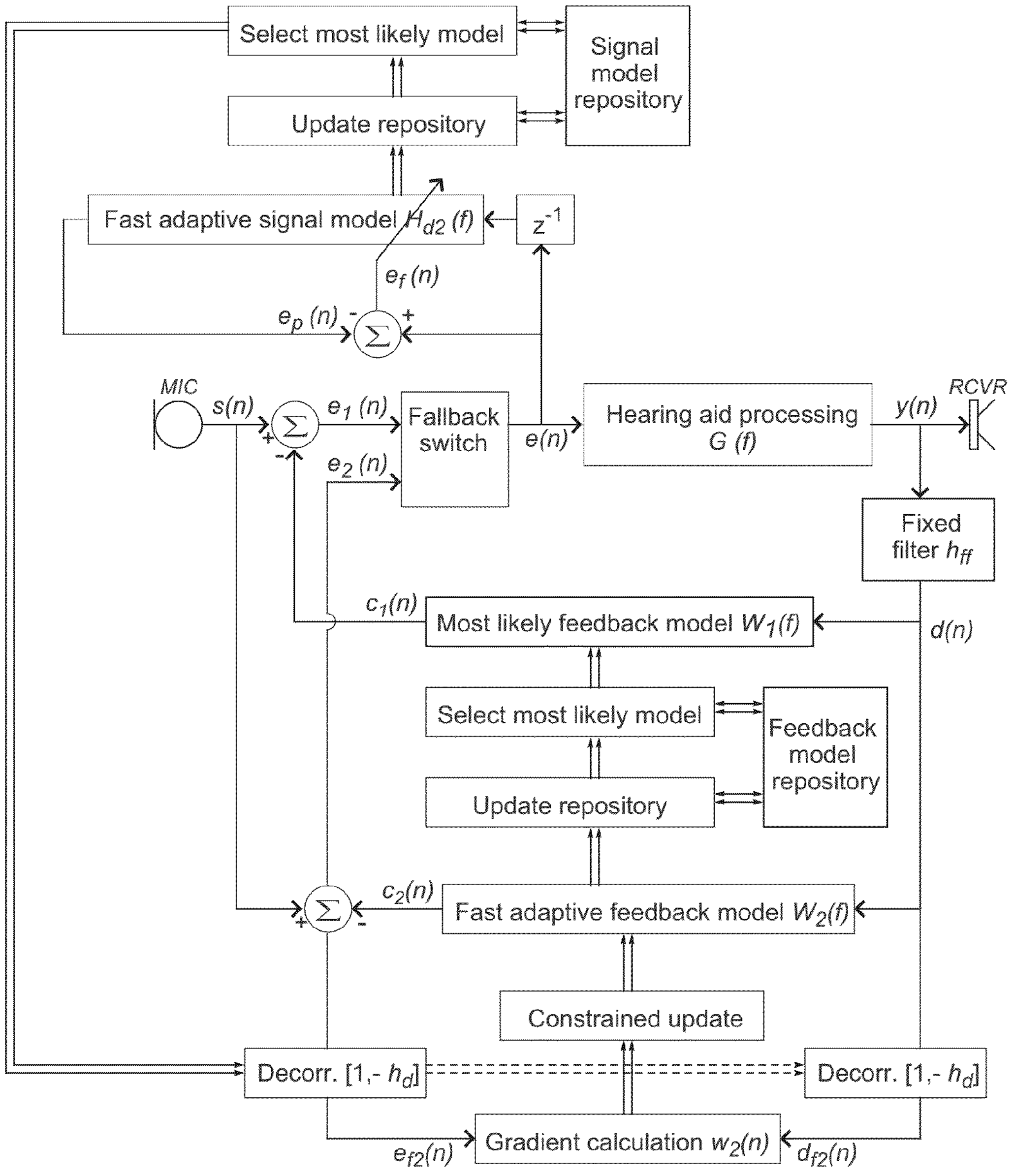
Figure 10:
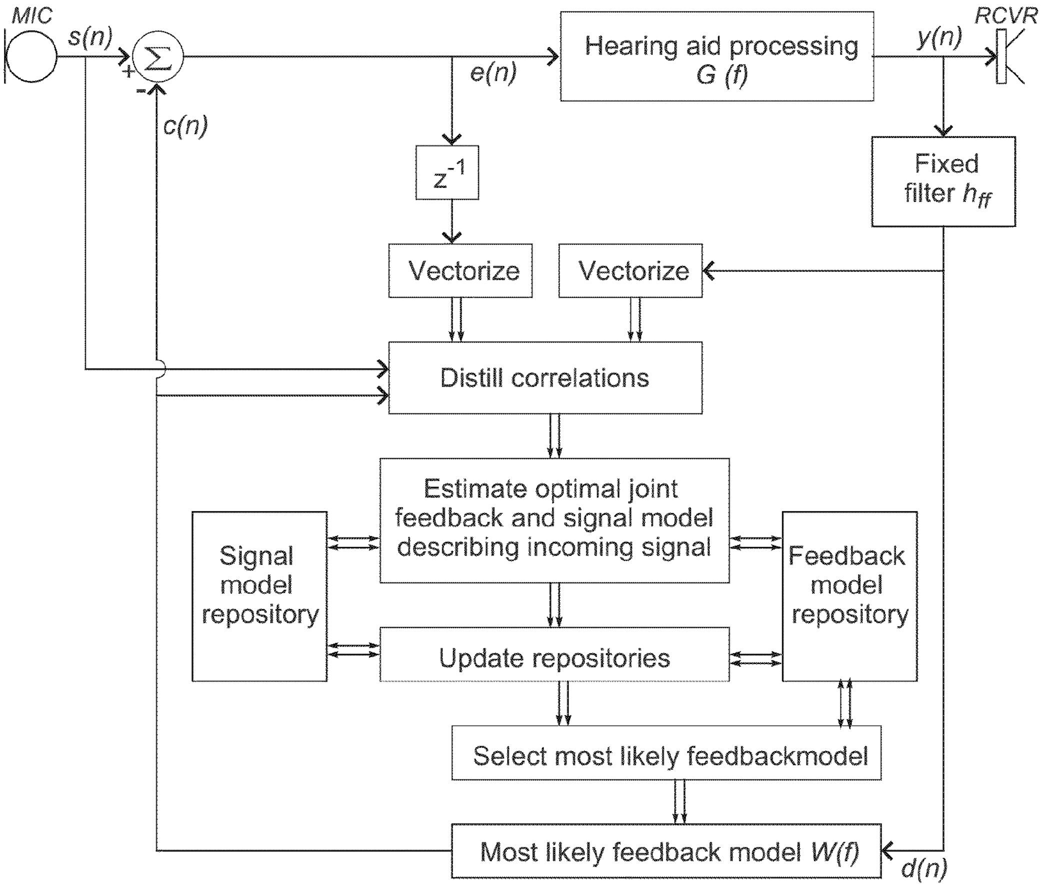

The above and other features and advantages will become readily apparent to those skilled in the art by the following detailed description of exemplary embodiments thereof with reference to the attached drawings, in which:

FIG. 1 is a model of prior art feedback cancellation in a hearing aid,

FIG. 2 schematically illustrates feedback path switching for the feedback cancellation circuit of FIG. 1, FIG. 3 shows plots of performance of prior art feedback cancellation circuits, FIG. 4 is a block diagram of a preferred embodiment, FIG. 5 shows plots of signal waveforms of the embodiment of FIG. 4, FIG. 6 shows plots of cluster membership counts and probabilities of the embodiment of FIG. 4, FIG. 7 shows plots of filter coefficients of the embodiment of FIG. 4, FIG. 8 is a block diagram of another preferred embodiment, FIG. 9 is a block diagram of an embodiment with a clustering signal model, and FIG. 10 is a block diagram of an embodiment with one combined model of the external signal and feedback signal.

The figures are schematic and simplified for clarity, and are for showing some of the features of the embodiments.

It should be noted that the embodiments shown in the accompanying drawings should not be limited to the configuration shown, and may have different configurations (e.g., different forms) in different embodiments.

DETAIL DESCRIPTION

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

In the illustrated embodiments, the device is used in connection with adaptive feedback cancellation in hearing instruments, but the device may be used in audio systems with one or more adaptive filters switching between near-stationary states.

Throughout the present disclosure, the expressions feedback cancellation and feedback suppression are used interchangeably. With a feedback cancellation or feedback suppression circuit, the influence of a feedback signal is attenuated and only in rare cases completely eliminated.

A hearing aid with a prior art feedback cancellation circuit is schematically illustrated in FIG. 1.

An external signal of interest x is amplified by a signal processor G that provides a processed output signal y. A receiver (not shown) converts the processed output signal into a sound signal after digital to analogue conversion (not shown). Some of the output signal y leaks back to the input and is added to the external signal x in the form of an unknown feedback signal, e.g. acoustical feedback signals, mechanically coupled feedback signals, electromagnetically coupled feedback signals, etc. In order to compensate for distortions and potential instability caused by this feedback loop, a feedback cancellation or suppression signal c, which attempts to model the signal f, is then subtracted from the external signal x. In the ideal case, c cancels f and e will equal x and the hearing aid will be able to provide sufficient amplification without audible distortion or artefacts.

Adaptive filtering techniques are used to form a feedback model W based on an analysis of the signal e. In this case, the filter coefficients constitute the feedback model parameters. A well-known conceptually straightforward technique often denoted “the direct approach” is to minimize the expected signal strength of e. The direct approach is known to provide biased results when the input signal exhibits a long-tailed auto-correlation function. In the case of tonal signals, for example, this typically leads to sub-optimal solutions because the adaptive feedback model will attempt to suppress the external tones instead of modelling the actual feedback. For many naturally occurring signals however this so-called bias problem is not so important because the typical hearing aid processing introduces sufficient delay to de-correlate the output from the input. Modern feedback cancellation systems nevertheless employ a number of additional tricks, such as constrained adaptation and (adaptive) de-correlation, to ensure stability in the presence of tonal input.

The incoming acoustic signal s to the hearing aid $$s(n)=x(n)+f(n) \tag{1}$$

is a sum of the signal of interest x and the distortions caused by feedback signal f. The so called error signal e(n) is obtained by subtracting the cancellation signal c:

$$e(n)=s(n)-c(n) \tag{2}$$

which is an approximation of the signal of interest x.

A standard N-taps FIR filter for modelling the feedback path is described by an input vector $$\vec{d}(n)=[d(n),d(n-1),\ldots,d(n-N+1)]^T \tag{3}$$

a weight vector $$\vec{w}(n)=[w_1(n),w_2(n),\ldots,w_N(n)]^T \tag{4}$$

and an inner product $$c(n)=\vec{w}(n)^T\vec{d}(n) \tag{5}$$

to obtain the cancellation signal c at each sample n.

An efficient technique to optimize the FIR filter defined above is the Block Normalized Least Mean Squares (BNLMS) update. BNLMS minimizes the square error criterion over a block of M samples $$J = \frac{1}{2M}\sum_{i=0}^{M-1} e(n-i)^2 \tag{6}$$

by calculating the gradient $$\nabla_w = -\frac{1}{M}\sum_{i=0}^{M-1} e(n-i)\vec{d}(n-i) \tag{7}$$

and the signal power $$\sigma_d^2 = \varepsilon + \frac{1}{MN}\sum_{i=0}^{M-1} \left|\vec{d}(n-i)\right|^2 \tag{8}$$

and combining them with an adaptation rate μ in the update $$\vec{w} \leftarrow \vec{w} - \frac{\mu}{\sigma_d^2}\vec{\nabla}_w \tag{9}$$

which is performed once for every M samples.

In a direct approach feedback canceller, the trade-off between a low steady-state error and a sufficient ability to track changes is determined by the adaptation rate μ. Small values of μ favour a low steady-state error while larger values favour good tracking. In practice values of μ are chosen between zero and one (values above one are normally of no use and values above two may even lead to divergence).

Noticeable changes of the sound environment of the hearing aid and thereby of the feedback path are typically caused by activities such as chewing, yawning, placing a phone to the ear, putting on a hat or scarf, moving into a different environment such as a car. Some of the dynamics involved are of a slow varying nature while others exhibit more sudden transients.

In order to illustrate the operation of feedback cancellation circuits, sudden changes in the sound environment and thereby the feedback path of the hearing aid are modelled with a switching linear system with multiple (approximately stationary) states as schematically illustrated in FIG. 2.

In its simplest form the feedback model is switching between two states. As an example, the performance is shown of a direct-approach feedback canceller with a feedback path that is switching between a feedback path where a phone is placed to the ear and a feedback path where the phone is removed. In the simulation the switching is performed instantaneously every 4 seconds. The external signal x is stationary white noise and the adaptive FIR filter of the feedback model uses 32 coefficients and a constant bulk delay. A linear gain, a dc-filter, and a hard clipper constitute the hearing aid processing. The gain is set at the maximum stable gain level without feedback cancellation for the worst of the two feedback paths. The NLMS block update is performed on blocks of 24 samples. In the simulation, shadow filtering is used to calculate the ideal response (the so-called shadow filtering runs in a separate branch where the feedback signal f and the cancellation signal c are both removed) and compare that to the actual signal e. FIG. 3 shows the signal to noise ratio, where the signal is the ideal signal (obtained by shadow filtering) and the noise is the difference between the ideal and the actual signal, for (1) a fast adaptation rate with set to 0.025 and (2) a slow adaptation rate with μ set to 0.001.

When the feedback path switches (at 4, 8, and 12 seconds), the fast update is able to respond rapidly. It reaches a stationary SNR level in about one tenth of a second, at about 17 dB, after which there is no further improvement. In contrast, the slow update requires significantly more time to react to the change. It takes roughly one second to reach the same SNR level as the fast update, but eventually reaches a much higher SNR level.

According to some embodiments, good tracking properties of the fast update are combined with excellent convergence properties of the slow update in stationary conditions. This is obtained by provision of a repository for storing feedback model parameters of the feedback path for various sound environments, for example filter coefficients of an adaptive filter. When a sound environment occurs for which corresponding feedback model parameters have been stored previously in the repository, modelling of the feedback path may again be performed based on these previously stored parameters whereby fast tracking is maintained without sacrificing the steady-state error. In the prior art, previous feedback model parameters are lost when a new situation occurs with a different feedback signal path. This is further explained below.

In the exemplary embodiment, schematically illustrated in FIG. 4, a fast adaptive filter $W_2$ for feedback cancelling is utilized in combination with clustering to store and retrieve sets of feedback model parameters corresponding to sound environments in the repository. In the illustrated embodiment, a set of feedback model parameters is constituted by the filter coefficients of the adaptive filter. The fast adaptive filter $W_2$ is similar to an adaptive filter utilized in a prior art feedback canceller and has an aggressive setting for the adaptation rate. It is used to estimate the current set of feedback model parameters and to track changes rapidly. Since the steady-state performance of this fast filter may be relatively poor if used alone for generation of the feedback compensation signal, it is only used for this purpose in special cases. In most cases, the fast adaptive filter is used to estimate the set of feedback model parameters to be used for generation of the feedback compensation signal. The filter coefficients of the fast adaptive filter are used as an estimate. The estimated feedback model parameters, i.e. the filter coefficients, are input to a clustering algorithm executed by the feedback suppressor circuit for storage of clusters in the repository. In this way, the feedback model parameter space is incrementally partitioned into a set of clusters representing recurring feedback paths of various situations or sound environments. Cluster centres in the repository, for example determined as averages of feedback model parameters in the cluster, are then available as feedback model parameters of the feedback path of the actual sound environment, i.e. filter coefficients corresponding to the feedback path of the actual sound environment. Thus, upon an update of the filter coefficients of the fast adaptive filter, the clustering algorithm updates the clusters based on the new set of filter coefficients, and selects the cluster that corresponds to the new set of coefficients. The cluster centre coefficients are then entered into the digital filter $W_1$ for provision of the feedback compensation signal $c_1(n)$ that is subtracted from the incoming signal s(n) to form the compensated audio signal $e_1(n)$ supplied to the signal processor.

In case that none of the clusters in the repository adequately matches the actual feedback path, the illustrated embodiment is equipped with a fallback switch to use the fast adaptive filter directly in the signal path as in a conventional feedback canceller.

During update of the clusters, the new set of filter coefficients may be incorporated into an existing cluster, a new cluster may be formed, two existing clusters may be merged, an existing cluster may be divided into two clusters, and/or an existing cluster may be deleted. This is further described below.

Clustering is a process of organizing objects into groups whose members are similar in some way. Thus, a cluster is a collection of objects any of which fulfils a certain criterion for that cluster. For example, the objects may be data that are grouped into clusters in accordance with a distance criterion, i.e. data residing close to each other are grouped into the same cluster. This is called distance based clustering.

It is well known in the art to use the Minkowski metric as a similarity measure, in this case a distance measure. If each data $x_i$ consists of a set of parameters $(x_{i,1}, x_{i,2}, \ldots, x_{i,n})$, then the Minkowski metric is defined by:

$$d_p(x_i, x_j) = \left(\sum_{k=1}^{d} |x_{i,k} - x_{j,k}|^p\right)^{\frac{1}{p}} \quad (10)$$

wherein d is the dimensionality of the data. The often used Euclidean distance is a special case of the Minkowski metric with p=2. The Manhattan metric is a special case of the Minkowski metric with p=1.

In the following, the similarity measure is called similarity distance to indicate that a small value indicates similarity and that a large value indicates dissimilarity.

Another kind of clustering is conceptual clustering in which a cluster is a collection of objects with a common concept.

Clustering algorithms may be classified into exclusive clustering, overlapping clustering, hierarchical clustering, and probabilistic clustering. In exclusive clustering, a member of a cluster cannot be a member of another cluster. In overlapping clustering, fuzzy logic is used to cluster the members so that members may belong to two or more clusters with different degrees of membership. Hierarchical clustering is based on the union of two nearest (most similar) clusters. At the start of the clustering process, each member defines a cluster and after a few iterations, the desired number of clusters is reached.

One of the best-known traditional clustering algorithms is the k-means algorithm introduced by MacQueen (J. MacQueen: “Some methods for classification and analysis of multivariate observations” in Proceedings of 5-th Berkeley Symposium on Mathematical Statistics and Probability, volume 1, pages 281-297. Berkeley, University of California Press, 1967). The k-means algorithm is an exclusive clustering algorithm and it assigns a data point to the cluster whose centre (also called centroid) is nearest. The centre is the average of all the data points in the cluster, i.e. its coordinates are the arithmetic mean for each separate dimension of all the points in the cluster. It maintains k cluster centres $$C=[\vec{C}_1, \ldots, \vec{C}_k] \quad (11)$$

each representing the mean of all vectors assigned to that cluster, and the membership counts $$\vec{M}=[M_1, \ldots, M_k] \quad (12)$$

for the number of vectors assigned to each cluster.

In the illustrated embodiment, the filter coefficients $w_1$ constitute the data points processed by the k-means clustering algorithm. When a new weight vector $\vec{w}$ arrives the k-means algorithm assigns it to the nearest cluster centre $C_n$ determined using a similarity or distance criterion d (for which the Euclidean distance function is typically used), increments the membership count $M_n$ by one and updates the cluster centre by $$\vec{C}_n \leftarrow \vec{C}_n + \frac{\vec{w} - \vec{C}_n}{M_n} \quad (13)$$

In the illustrated embodiment, the MacQueen update of the k-means algorithm is used in connection with a Gaussian mixture model with a shared spherical covariance structure, cf. A. Sam'e, C. Ambrosie, and G. Govaert: “A mixture model approach for on-line clustering” in Compstat 2004, 23-27 Aug. 2004, Prague, Czech Republic. http://eprints.pascal-network.org/archive/00000582/, 2004. The primary advantages of the k-means algorithm, compared to well-known alternatives such as the batch Expectation-Maximization (EM) algorithm, are its simplicity, speed, and low complexity through the use of only first order statistics (e.g., inverse covariance matrices are not needed).

In the Gaussian mixture model, each cluster is a Gaussian with a mixing proportion, mean, and covariance matrix. The Gaussian mixture model makes it possible to find potential solutions (maxima) in between the peaks of each individual cluster.

Further, the covariance information of individual clusters characterizes the clusters in more detail than, e.g., a single characteristic length (which essentially corresponds to a scaled unity covariance matrix).

The feedback suppressor circuit may be configured to share statistical information between clusters, e.g., use one covariance matrix for several or all clusters. This makes the model more efficient because similar clusters can collect statistics at a higher rate. E.g., if the covariance matrix is formed individually for each cluster, it takes significantly more time than if the information is shared. Further, because such a matrix may have to be inverted, sharing the information reduces the risk of singularity problems (where the matrix inversion is unreliable).

In an embodiment, a forgetting factor $\gamma$ is introduced for the membership counts by performing the update $$\vec{M} \leftarrow \gamma\vec{M} \quad (14)$$

at each iteration (typically $0<<\gamma<1$). The effect of the forgetting factor is twofold. First it introduces a soft upper bound on the membership counts, which ensures that the update always maintains some minimal amount of adaptivity. In a useful algorithm this is necessary because otherwise the update would eventually freeze. The second effect is that it facilitates the detection of outliers by having a low membership count. Outliers typically get sampled a few times when something radical happens, e.g. the hearing aid is removed from the ear canal by the user, the hearing aid is dropped, the hearing aid is turned on, etc. Feedback model parameters corresponding to such rare events may not be required to be stored indefinitely. Consequently when the cluster membership count falls below some predefined threshold, it can simply be removed from the repository.

In an embodiment, the clustering includes formation of new clusters, deletion of existing clusters, and merging of clusters. The feedback suppressor circuit may keep track of the distances between cluster centres, specifically tracking the minimum distance $d_m$ between the two nearest clusters $\overrightarrow{C_{m_1}}$ and $\overrightarrow{C_{m_2}}$. When a new vector $\vec{w}$ arrives, the distance $d_n$ to its nearest cluster centre $\overrightarrow{C_n}$ is computed. Further, a characteristic length a for the current vector $\vec{w}$, which can be interpreted as an estimate of the standard deviation of the current cluster is estimated, e.g. by selecting a proportional to the length of the vector $\vec{w}$ (the reason for this is that the standard deviation of the feedback models is expected to be proportional to the strength of the feedback signal). Alternatively, an individual $\sigma_i$ for each cluster is estimated. Finally, the smallest cluster $\overrightarrow{C_l}$ that has the lowest membership count $M_l$ is identified.

Using this information, updating the cluster centres proceeds to one of the following three cases.

(1) if ($M_l<M_{min}$) & ($d_n>\alpha\sigma$)

If the minimal membership count $M_l$ is smaller than some minimal value $M_{min}$ (e.g. $M_{min}=1$) and the distance to the nearest cluster $d_n$ is greater then $\alpha\sigma$, where $\alpha$ is a tuning parameter (typically in the order between 1 and 3 when $\sigma$ is an estimate of the standard deviation), then cluster $\overrightarrow{C_l}$ is replaced by the incoming vector $\vec{w}$ and its membership count is set to one.

(2) else if ($d_m<d_n$)

If the distance between the two nearest cluster centres $\overrightarrow{C_{m_1}}$ and $\overrightarrow{C_{m_2}}$ less than the distance of the incoming vector $\vec{w}$ to its nearest cluster centre then the two nearest clusters are merged and the other entry is replaced by $\vec{w}$ with its membership count set to one. The membership count and the centre of the merged cluster are calculated by $$M_{merged}=M_{m_1}+M_{m_2} \tag{15}$$

$$\vec{C}_{merged}=\frac{M_{m_1}\overrightarrow{C_{m_1}}+M_{m_2}\overrightarrow{C_{m_2}}}{M_{merged}} \tag{16}$$

(3) default

In the case that no clusters are merged or replaced, $\vec{w}$ is assigned to its nearest cluster centre using the original MacQueen update.

In the following, one way of selecting a set of feedback model parameters from the set of cluster centres stored in the repository is explained. The nearest cluster centre as already identified by the cluster algorithm update may be selected, although it is preferred to take the membership counts into account to avoid that the selected model becomes a newly created cluster too often in which case little or no advantage over the fast adaptive feedback model is obtained.

To overcome this problem, a mixture of Gaussian algorithm is utilized, i.e. it is assumed that the probability density function of the clusters is Gaussian. The Gaussian probability density at point $\vec{w}$ in an N-dimensional space around the cluster with mean $\overrightarrow{C_i}$ and covariance matrix $R_i$ is given by $$P(\vec{w}\mid\vec{C_i})=\frac{1}{\sqrt{|R_i|(2\pi)^N}}\exp\left(-\frac{1}{2}(\vec{w}-\vec{C_i})^T R_i^{-1}(\vec{w}-\vec{C_i})\right) \tag{17}$$

Assuming spherical clusters, with a shared identical diagonal structure of the covariance matrix, equation (16) can be simplified:

$$P(\vec{w}\mid\vec{C_i})=\frac{1}{\sigma\sqrt{(2\pi)^N}}\exp\left(-\frac{d(\vec{w}-\vec{C_i})^2}{2\sigma^2}\right) \tag{18}$$

As mentioned before, in this exemplified embodiment, $\sigma$ is estimated to be proportional to the length of vector $\vec{w}$ (i.e., $d(\vec{w},\vec{0})$). Alternatively, $\sigma$ can be set as a constant based on prior information about an appropriate cluster scale, or, an individual $\sigma_i$ may be estimated for each cluster.

Under the assumption that the prior probability of a cluster i is characterized by its relative membership count, the likelihood of a cluster i generating the observed vector $\vec{w}$ is estimated by $$P(\vec{C_i}\mid\vec{w})=P(\vec{C_i})\frac{P(\vec{w}\mid\vec{C_i})}{P(\vec{w})}=\frac{M_i}{\sum_{j=1}^{k}M_j}\frac{P(\vec{w}\mid\vec{C_i})}{\sum_{r=1}^{k}P(\vec{w}\mid\vec{C_r})} \tag{19}$$

In practice, exact knowledge of each probability is not needed. It is only required to identify the cluster with the highest probability. For this purpose, equation (18) is simplified by utilization of the logarithm and removal of all additive constants (everything that came from the denominators and constants of the Gaussian probability density function), leading to.

$$\log(P(\vec{C_i}\mid\vec{w}))\sim\log(M_i)-\frac{d(\vec{w},\vec{C_i})}{2\sigma^2} \tag{20}$$

having a maximum value for the most likely cluster to be used as feedback model $W_1$.

During use, a new situation may arise for which none of the clusters in the repository provide adequate performance. In this case, the fast adaptive filter is available as a fallback option. The fallback switch operates independently of assumptions made in the clustering model and directly compares the feedback cancellation error $e_1(n)$ (which for a direct approach feedback canceller is simply the power over one block) of the signal generated by the most likely model in the repository to the error of the signal $e_2(n)$ generated by the fast adaptive model. If $e_1(n)$ exceeds that of $e_2(n)$ by some predefined margin, the fallback switch connects the fast adaptive filter for conventional feedback cancellation, and during update of the clusters, the new set may be incorporated into an existing cluster, a new cluster may be formed, two existing clusters may be merged, an existing cluster may be divided into two clusters, and/or an existing cluster may be deleted. Otherwise, the fallback switch connects the digital filter $W_1$ for feedback cancellation.

As an example, the experiment explained in connection with FIG. 2 is repeated with a feedback path switching instantaneously every 4 seconds between a feedback path where a phone is placed to the ear and a feedback path where the phone is removed, but now, instead of using a direct approach canceller as shown in FIG. 2, the embodiment shown in FIG. 4 is used. In this example, the number of clusters k is 3, which should be sufficient when dealing with only two feedback paths. Of course more clusters may be used, but for simplicity the number of clusters is limited to 3.

FIG. 5 shows the output waveforms and the associated signal to noise ratios (where the signal is the ideal output calculated using shadow filtering as explained in connection with FIG. 2). At time equal to zero, the system is initialized with all model coefficients at zero. During the first seconds, the performance is steadily increasing, at 4 seconds the feedback path changes (to having a phone placed to the ear). At 8 seconds the phone is removed, and the embodiment returns to the original feedback path. Since both feedback paths have now been observed, the switching becomes very rapid while the SNR level remains at a near constant high plateau (the SNR level is lower with the phone present because the feedback signal is larger in this situation).

FIG. 6 illustrates the operation of the clustering algorithm. The upper plot shows the membership counts while the lower plot shows the estimated model likelihoods. At start-up there are no clusters, but it does not take long before one cluster starts to dominate the situation, in this case cluster 2, and the membership count grows. After 4 seconds the situation changes; cluster 3 starts to receive members, and the membership count of cluster 2 starts to decay. After 8 seconds both cluster 2 and 3 have a fair amount of members and the model likelihoods convincingly reflects the sudden changes in feedback paths.

In this example cluster 1 remains small (and unlikely) because there are only two stationary feedback paths. Occasionally it may grow a bit, but since it cannot become sufficiently different from the two big clusters its members are eventually absorbed by one of the big clusters (through the merging operation).

FIG. 7 shows the filter coefficients (feedback model parameters) of the most likely model $W_1$ and the fast adaptive model $W_2$. The noisy behaviour of the fast adaptive filter is evident. Moreover, it is clearly shown that (at least in this example) the most likely model is much more stable and still has the fast switching capability.

It is an important advantage that the trade-off of prior art feedback cancellation circuits with adaptive filters between static and dynamic performance has been significantly improved.

In some embodiments, the amount of improvement gained depends on (1) the signal to noise ratio, (2) the extent of variation of the sound environment experienced during use of the device, and (3) the ability to represent meaningful clusters.

When applied in feedback suppression, point 1 is influenced by the gain (which sets the balance between the strength of the feedback signal and the external signal). If gain is very high (e.g., 10-20 dB above the Maximum Stable Gain without feedback suppression MSGoff), then the standard adaptive filters have an excellent signal to work with and may already provide adequate performance without a repository. In some embodiments, when the gain is lower (e.g., at or below MSGoff, such as in the example) then the advantage becomes more pronounced. The reason for this is that, especially in poor SNR conditions, standard adaptive filters must average over a longer time frame (or equivalently use a smaller adaptation rate) to obtain a high-quality model estimate. Obviously, when it takes a long time to find a good model, it will be more worthwhile to preserve it in a repository.

Regarding point 2 relating to the extent of variation of the sound environment. If the environment is too stationary, i.e., there is only one signal path, there will not be much benefit in trying to segment the parameter space. If on the other hand the environment is highly non-stationary, with frequent transitions between a variety of feedback paths, then the clustering model may not be appropriate either. Embodiments described herein are well suited in an environment that is stationary most of the time, but occasionally switches between different feedback paths. Typically, a hearing aid with feedback suppression is used in this way. Sudden changes in the feedback path occur when the user of the hearing aid, e.g., picks up a phone, or lays his or her head on a pillow.

Regarding point 3: the ability to represent meaningful clusters, this primarily depends on the distance/dissimilarity criterion and the associated geometry and compactness of the solution space. Thus, it is important whether a FIR representation, a FFT mapping, a transformation to reflection coefficients, or some pre-processing is used to reduce the dimensionality by, e.g., a PCA or LDA mapping. In general the ideal representation must have compact separable clusters, meaning that the within-scatter (the distances within one cluster) is low and the between-scatter (the distances between clusters) is high. In this respect a raw FIR representation may not be optimal (for example because phase shifts may violate compactness), but nevertheless, the illustrated embodiment has shown that the approach works reasonable well in practice.

Below a number of additional embodiments is disclosed.

FIG. 8 shows a block diagram of an embodiment corresponding to the embodiment of FIG. 4 with adaptive de-correlation added. Adaptive de-correlation is applied to the signal $e_2$ to obtain the so-called filtered error signal $e_{f2}$. Adaptive de-correlation is applied symmetrically to the adaptive filter inputs d so that cross-correlating both signals provides a gradient estimate to minimize the filtered error criterion, which is known to be more robust with tonal or self-correlated external signal conditions. In the illustrated embodiment, the signal model $h_d$ used in the de-correlation filters is obtained from $e_2$. However alternatively, the signal model may be obtained from e (after the fallback switch), or simply use a fixed de-correlation filter (which would be the standard Filtered-X solution). Naturally the signal model may also be used to improve the decision made in the fallback switch (using the filtered error instead of the normal error).

Further, adaptive non-linear de-correlation may be applied in the signal path. Non-linear de-correlation in the signal path decreases the correlation of the external signal with the hearing aid output. The contribution to the input signal caused by feedback remains equally correlated (because the applied non-linearity is known) so it becomes easier to distinguish feedback from tonal input and consequently the feedback models will improve.

The adaptive non-linear de-correlation may be applied depending on the selected cluster. Non-linear de-correlation in the signal path may lead to perception of distortion and therefore it may be desirable to utilize non-linear distortion for the most problematic feedback paths, which can be identified by the specific parameters and statistics of the cluster.

In the embodiment of FIG. 8, the coefficient update is further constrained.

The feedback suppressor circuit may further be configured for maintaining a clustering model of the external signal whereby sensitivity to non-stationary tonal input is reduced.

A block diagram of such an embodiment is shown in FIG. 9. The embodiment of FIG. 9 is a straightforward extension of the embodiment of FIG. 8 with adaptive clustering applied also to the model of the external signal.

In some sound environments, the external signal and background noise have relatively constant characteristics most of the time, but occasionally switches rapidly to different levels. It should be noted that, compared to FIG. 8, the insertion point in FIG. 9 for obtaining the signal model has been moved to e instead of $e_2$. This may have some advantages with respect to stability since otherwise the two fast adaptive filters operate in cascade, but in principle both insertion points can be used for obtaining a signal model.

For efficiency reasons, a k-means clustering algorithm was used in the illustrated embodiments that only requires calculation of the first order statistics of the clusters. In general however, the performance may be further improved provided that sufficient computational resources are available by incorporating higher order statistics, e.g., co-variances, in the cluster models. For updating the clusters, instead of using the MacQueen update, utilization of one or more iterations of the EM (Expectation Maximization) algorithm may be considered. Further, it is contemplated to utilize a more refined, possibly non-Gaussian, underlying probability density function for the clusters.

In the illustrated embodiments, the most likely model based on a comparison with the fast adaptive filter coefficients is used. An alternative would be to calculate the full least-squares error, either by actually running all models in parallel or by deriving it from the auto- and cross-correlation statistics, and simply select the model with the lowest error. Yet another alternative is to include the fast adaptive filter in the statistical model and, e.g., include a confidence in the observed vector $\vec{w}$ to avoid switching models when the fast adaptive filter itself is considered unreliable or in a transition state.

Another alternative for selecting the model is not to do a hard selection at all. Instead, the most likely model may be formed by a weighted sum of all the models in the repository.

Further, a history of models selected in previous iterations may be stored, e.g. in the repository for improving the performance. In particular, frequent switching may be prevented in this way, e.g. by smoothing the likelihoods over time.

In addition to forming clusters during use, fixed models may also be provided that can be selected in the same way that clusters formed during operation are selected. Of course, such an approach is only feasible when prior information is available, for example by means of an initialization procedure as is typically performed in modern hearing aids.

Further, fixed clusters may be provided, e.g. by storing a limited number of models that once have been dominant for a very long time without the forgetting factor.

Moreover, models used by one user may be combined with models used by other users and stored as models in a repository of a new user.

In some cases, embodiments described herein may also be utilised in a multi-channel hearing aid in which the incoming audiosignal is divided into a number of bandpass filtered signals (frequency channels) that is individually processed in the signal processor, e.g. in accordance with the audiogram recorded for the user, i.e. based on the hearing threshold as a function of frequency. The processed bandpass filtered signals are combined together, e.g. in a summing circuit, for digital to analogue conversion and conversion to an acoustic signal in the receiver. Likewise, the feedback cancellation circuit may be divided into a number of frequency channels that is individually processed in the feedback suppressor circuit as disclosed above for a single channel. Additionally, the feedback suppressor circuit may be configured for sharing statistics across channels. Feedback path changes of various frequency channels probably correlate strongly. Consequently, an improved performance may be obtained if, e.g., each cluster represents the combination of all feedback paths, which may for example be achieved by concatenating the filter coefficients.

In the illustrated embodiment, the fast adaptive feedback filter for determining the vector $\vec{w}$ of filter coefficients is outside the clustering model. This reduces the complexity of the system. It is also possible to perform inference directly on the observed incoming signal s, out-going signal y (or d) to directly update all feedback models available in the repository, as well as possibly some signal models for de-correlation (which may be stored in a similar way as the feedback models).

Given an observed input signal s and a (delayed) output signal d, the observations of s and d are characterized by the statistics S. For a linear system S should at least contain information about the autocorrelation of d and the cross-correlations between s and d, but may also contain higher order statistics, e.g., for dealing with non-linear feedback paths, as well as any statistics needed for maintaining a signal model, e.g., for adaptive de-correlation.

A possible design for obtaining the statistics S is shown in FIG. 10. In FIG. 10, the block responsible for collecting the statistics, labeled 'Distill correlations', receives input from the microphone signal s, the current best estimate of the feedback signal c, the current best estimate of the external signal e with a one sample delay, and the output of the hearing aid d passed through the fixed filter, which in its simplest form is a delay. The signals from e and d are vectorized to obtain $\vec{e}$ and $\vec{d}$, meaning that a short term description of recent samples is collected in the form of a vector. In its simplest form the vectorization is a tapped delay line as used in standard direct form filters, but more advanced realizations may expand the vectors with filtered inputs (as in, e.g., a warped delay line), higher order polynomials, and otherwise linearly or non-linearly transformed terms. The block that distills the correlations may at least compute the cross-correlations between s and the vectorized input from d thereby providing the minimum statistics needed for a direct approach canceller. More advanced embodiments may, e.g., compute cross-correlations between the joint vectorized inputs and the signal s, as well as an auto-correlation matrix for the joint vectorized input. Statistics of orders higher than two may be computed as well, but are not absolutely necessary because the vectorization blocks can add the non-linear terms and a linear mapping from non-linear features may suffice to fit a non-linear feedback path. In a hearing aid the signal processing performed in G may be assumed to provide a delay in the signal path that is sufficient to ensure that any direct contributions to the vectorized estimate of the external signal $\vec{e}$ at time n will not yet be present in the output signal y at time n. Consequently, correlations between s and $\vec{e}$ are not directly caused by the feedback path although there is of course still an indirect relation through the coloration of the feedback path when the cancellation signal deviates from the actual feedback signal. On the other hand, the feedback path leads to correlations between s and $\vec{d}$. This is not valid for an external signal with a long tailed auto-correlation function, e.g., a tonal input. When the tonal input signal is highly correlated with both $\vec{e}$ and $\vec{d}$, the short term statistics on their own are ambiguous (i.e. the joint input vector has redundancies) and may not suffice to distinguish feedback from the external signal, and hence may not suffice to provide a unique solution. An example is a pure sine tone where identical periods are present in both $\vec{d}$ and $\vec{e}$. There are a number of strategies to deal with this scenario. The simplest approach is to use a standard least-squares update, and simply calculate the average of both sources. A second alternative is to first optimize the predictions based on the estimated external signal $\vec{e}$ and then only use the residual error to adapt the feedback model(s), which corresponds to the previously mentioned solution using adaptive de-correlation. A third possibility is to optimize the predictions from $\vec{d}$, while applying some constraints depending on the observed correlations with $\vec{e}$ to ensure stability. Constraints are necessary in this case because this update is biased. In principle that last option is not very interesting in most cases, because it has the tendency to aggressively suppress any tonal input, but it may have some merits at extremely high gains. Yet another possibility may be to interleave updates of feedback and signal parameter estimates. Probably the best solution to deal with ambiguous statistics is through the use of prior knowledge. This prior knowledge can be maintained in the form of a probability density function describing the likelihood of the various possible parameter settings using a set of mixture components that are maintained in the feedback (and signal) model repository. Using this prior knowledge, at least in principle, enables us to come up with better-informed decisions on updating the feedback model.

In one embodiment of the feedback cancellation system, a plurality of candidate feedback models $W_i$ is provided. Each candidate feedback model $W_i$ typically contains a set of filter coefficients like the cluster centres, but may also contain a specific design structure, e.g., some models may use longer filters than others. In addition, a plurality of signal models $X_j$ may be provided, which are used internally to distinguish correlations caused by the actual feedback path from correlations inherently present in the external signal (unrelated to the feedback).

Given the observed statistics of the environment, $p(S|W_i, X_j)$ may be calculated, which represents the likelihood that a candidate feedback model i with an external signal model j is responsible for generating the observed statistics. From this, using Bayes' rule, the likelihood of the candidate models is inferred given the observed statistics $$p(W_i, X_j \mid S) = \frac{p(S \mid W_i, X_j)p(W_i, X_j)}{p(S)} \tag{21}$$

If the fact that the feedback models should be independent of the external signal models ($p(W_i,X_j)=p(W_i)p(X_j)$), the joint likelihood of feedback model i with signal model j given S is $$p(W_i, X_j \mid S) = \frac{p(S \mid W_i, X_j)p(W_i)p(X_j)}{p(S)} \tag{22}$$

Since the signal model is only used internally, in order to explain the observed statistics, only the likelihood of the feedback models given S is relevant. It is obtained by summing over all signal models:

$$p(W_i \mid S) = \sum_{\forall j} p(W_i, X_j \mid S) \tag{23}$$

which of course becomes simpler for one signal model, e.g. the embodiment of FIG. 8.

The most likely feedback model to be used in the signal loop may be selected in various ways. Firstly, a hard selection of the maximum a posteriori (MAP) estimate may be made simply by enumerating over all candidate models and selecting the one maximizing equation (23). It should be noted that P(S) need not be calculated since its function as a scaling factor does not influence determination of the maximum.

Alternatively, a relative degree of 'ownership' may be determined, e.g., proportional to the model likelihood, and select the feedback model as a weighted combination of the models in the repository. A third possibility is to use all clusters in the repositories as components of a (Gaussian) mixture model, and search for a new model W* in a continuous parameter space of feedback models w, to maximize the posterior likelihood $$P(w \mid S) = \sum_{\forall i} \sum_{\forall j} P(w, W_i, X_j \mid S) \tag{24}$$

$$W^* = \arg\max_w (P(w \mid S)) \tag{25}$$

With the last two possibilities the tracking of the feedback path becomes continuous, with the cluster models only being active in the background.

The advantage of this, in contrast to the discrete switching associated with a hard selection, may be that certain repetitively occurring dynamics may be modelled more accurately.

By enumerating all candidate models, the expectations regarding the likelihood of observing the statistics S can be calculated in accordance with:

$$p(S) = \sum_{\forall i} \sum_{\forall j} p(S \mid W_i, X_j) \tag{26}$$

To improve the models, adjustments are desired in such a way that this marginal likelihood is maximized. To this end the candidate models can be updated, incrementally, using one or more of the following operations:

1. Hard assignment: Observed statistics may be classified as belonging to one particular 2-tuple (i, j) of feedback and signal model, in which case only the corresponding feedback and signal models are updated.

2. Soft assignment: Observed statistics may be characterized by some fractional ownership of several feedback and signal models, representing the degrees of certainty when multiple models may have been responsible. In this case all the models are updated relative to their degree of ownership.

3. Merge: Two models may be merged into one. This is typically done when two existing models have become rather similar and a combined model is sufficiently well suited to describe the current situation.

4. Split: A model may be split into two. This could, e.g., be done when a model becomes too general and does not describe the current situation in sufficient detail.

5. Delete: When a model becomes unlikely it may be deleted. This is typically done to get rid of outliers and obsolete knowledge.

6. Create: When a new situation appears a new model may be created.

The effect of any of the operations described above can be assessed by comparing the marginal likelihood p(S) before and after the operation, which enables a search procedure, or the formulation of a set of rules, to perform the operations needed to optimize the models.

It should be noted, though, that it is not necessary to restrict the update to use only the above categorization of operations. Standard optimization techniques, such as the EM algorithm, or any other search procedure that is able to incrementally increase the marginal likelihood, may be considered. In the illustrated embodiments, the total number of clusters has been kept fixed, which implies that the merge, split, delete and create operators are always applied in pairs, e.g., if one cluster is deleted, another cluster is created. In general however, a variable number of clusters is allowed. This can be done by making the assumptions about the model complexity explicit in the above formula, i.e. p(S) becomes $p(S|H(i_{max}, j_{max}))$. It is even possible to take this one step further and allow the number of clusters to become infinite. Although practical implementations will only maintain a finite number clusters, the underlying inference process in a Bayesian mixture model can be done as if there are an infinite number of mixture components, cf. C. Rasmussen: "The Infinite Gaussian Mixture Model" in Advances in Neural Information Processing Systems, MIT Press, 12: 554-560, 2000. An especially appealing property of this is that it elegantly sidesteps the problem of finding the right number of clusters.

In one embodiment, the hearing aid may further comprise an environment detector for detection of the sound environment of the hearing aid and wherein the feedback suppressor circuit is further configured for determining a set of feedback model parameters based on the sound environment detection and the sets of feedback model parameters stored in the repository for modelling the feedback signal path corresponding to the detected sound environment.

The hearing aid processor may further be configured to reduce gain in the signal path depending on the selected feedback path model. Gain reduction is a well-known remedy for oscillation reduction or elimination. Based on the selected cluster, the feedback suppressor circuit may provide an estimate of the strength of the feedback signal for determining whether a gain reduction is appropriate.

The feedback suppressor circuit may further be configured for maintaining a statistical model of the external signal for distinguishing correlations between the hearing aid output and input caused by feedback from correlations already present in the external signal (tonal input) whereby sensitivity to tonal input is reduced.

The feedback suppressor circuit may further be configured to individually process multiple input signals, e.g. provided by two or more microphones, e.g. in order to obtain improved directionality.

The feedback suppressor circuit may further be configured to share information between the multiple input signals for improved directionality. Feedback models become more efficient because changes in the feedback path are likely to be correlated when the microphones are close to each other. By improving the feedback models the algorithms providing the directionality have a better input signal.

The feedback suppressor circuit may further be configured to use a shared signal model, e.g., for adaptive de-correlation, for several or all of the input signals.

The observed external signal from each microphone may be assumed to be nearly identical, except of course with respect to the time of arrival. Utilization of one signal model improves the statistics and hence a better and more reliable estimate of the feedback paths is obtained compared to the situation in which each channel has its own signal model.

The feedback suppressor circuit may further be configured for clustering models that combine the feedback paths of all input signals whereby switching between feedback paths becomes more reliable because changes to one channel should be highly correlated with changes to the other channel(s) assuming the microphones are positioned close to each other.

The feedback suppressor circuit may further take higher order statistics into account to characterize receiver, amplifier, and/or microphone non-linearities in the feedback path whereby performance is improved in, e.g., power devices where the extreme gains may drive the analogue components into saturation, which may be best modeled by a non-linear time-varying feedback path.

The clustering and selected feedback model statistics may be stored in a log. Further, the encountered signal model statistics may be stored in a log.

Hereby, if the user experiences a problem with the device, the user can go back to the dispenser who can then get more detailed information regarding the sound environments and situations that may have been responsible for the problem. This enables a dispenser to provide better service. For example, it may be observed that problems occur when listening to a specific class of signals.

The performance of the feedback suppressor circuit may also be stored in a log.

Statistics on the history of selecting clusters may be stored and these data may be provided to the dispenser for counseling. For each particular cluster, the number of times it was selected may be recorded and optionally its time duration of use, the sound environment in which it was used, such as speech, music, noise, etc., the average modeling errors, etc. Moreover, sets of often used feedback path models can be collected by the dispenser or manufacturer. Useful models of one user may be combined with useful models from other users and used as starting models for a new user.

Presence of a nearby reflection, such as from a phone, may be determined based on the selected cluster whereby certain actions may be triggered for user assistance, e.g., automatically switching to a phone mode, making automatic adjustments in the signal path, such as reducing the gain, etc. FIG. 2 and the corresponding part of the description showed formation of a distinct cluster when a phone is placed at the ear of the hearing aid user.

The use of a phone may further be detected based on the current signal model, e.g., as used for adaptive de-correlation whereby detection of presence of a phone may be improved because (1) phones typically use a narrower frequency range than the normal incoming signal, and (2) the predominant signal model during phone listening will have a form characteristic of speech.

Phone detection is useful because it enables the hearing aid to take appropriate measures such as maximizing speech intelligibility when using the phone. It has already been described that the device is able to rapidly track changes caused by picking up a phone in accordance with some embodiments. Further, the presence of a phone is typically associated with an increase in feedback signal strength by roughly 3 to 6 dB, see for example the weights in FIG. 7. A simple phone detector could compare the current feedback signal strength, e.g. using a one norm length of the feedback path coefficient vector, to a long term average. More refined versions could also compare the current estimate to a set of template models, or simply have a fixed cluster present in the repository appropriate for the average phone. By combining the detection based on the active cluster with other characteristics of the incoming signal, a more reliable detection is obtained. During phone usage, the incoming signal is typically band-limited speech, which may be detected using the internal signal model constituted by the sets of feedback model parameters stored in the repository or, by using a standard voice activity detector to improve the phone detection rate.

Further, it is well known that some speech characteristics can be modeled quite well using Auto-Regressive techniques. The de-correlation filter in FIG. 9 learns an Auto-Regressive model of the incoming signal, so consequently the signal repository will contain a set of Auto-Regressive models, which can be compared to a set of template Auto-Regressive model characteristics of speech.

Positioning of the hearing aid, i.e. is the hearing aid inserted in the ear canal, is the hearing aid removed from the ear canal, or is the hearing aid positioned incorrectly in the ear canal, may be detected based on the selected cluster whereby the operation of the hearing aid may be automatically controlled, e.g. the gains may be temporarily reduced during repositioning of the hearing aid, the hearing aid may be automatically turned off when it is removed from the ear canal, etc.

It is noted that in the illustrated embodiments, the feedback suppression circuit is configured for modelling the external feedback path in an internal feedback loop and to subtract an estimated feedback signal from the input signal in order to compensate for external feedback, such as acoustic feedback. As an alternative, the feedback suppression circuit may be connected in an internal feed-forward path and may, for example, contain adaptive notch filters for gain reduction. Embodiments described herein may be utilized in such types of feedback suppression circuits, which are often called feedback cancellation or feedback suppression systems.

Although particular embodiments have been shown and described, it will be understood that it is not intended to limit the claimed inventions to the embodiments, and it will be obvious to those skilled in the art that various changes and modifications may be made. The specification and drawings are, accordingly, to be regarded in an illustrative rather than restrictive sense. The claimed inventions are intended to cover alternatives, modifications, and equivalents.

The invention claimed is:

1. An audio system comprising:

a signal processor for processing an audio signal, and a feedback suppressor circuit comprising an adaptive filter and configured for modelling a feedback signal path of the audio system by provision of a feedback compensation signal based on a cluster of feedback model parameters for the feedback signal path that are stored in a repository, wherein at least a subset of the feedback model parameters comprises coefficients for the adaptive filter, or is for use to obtain the coefficients for the adaptive filter;

wherein the audio system is configured to apply a gain reduction in the signal path depending on the cluster of the feedback model parameters; and wherein the audio system is a hearing aid or a communication system.

2. The audio system according to claim 1, further comprising a first subtractor for subtracting the feedback compensation signal from the audio signal to form a compensated audio signal supplied to the signal processor.

3. The audio system according to claim 1, further comprising an environment detector for detection of a sound environment of the audio system, and wherein the feedback suppressor circuit is further configured for determining an additional cluster of feedback model parameters based on the sound environment detection for modelling the feedback signal path corresponding to the detected sound environment.

4. The audio system according to claim 1, wherein the adaptive filter is for modelling the feedback path.

5. The audio system according to claim 1, wherein the adaptive filter comprises a digital filter, and wherein the one or more coefficients comprises one or more filter coefficients obtained using the at least a subset of feedback model parameters stored in the repository.

6. The audio system according to claim 1, wherein the cluster of the feedback model parameters is predetermined.

7. The audio system according to claim 1, wherein the feedback suppressor circuit is further configured to operate on multiple input signals independently.

8. The audio system according to claim 1, wherein the audio system is configured to use a selected feedback model to detect a presence of a nearby reflection.

9. The audio system according to claim 1, further comprising the repository.

10. An audio system comprising:

a signal processor for processing an audio signal, and a feedback suppressor circuit comprising an adaptive filter and configured for modelling a feedback signal path of the audio system by provision of a feedback compensation signal based on one or more of feedback model parameters for the feedback signal path that are stored in a repository, wherein at least a subset of the feedback model parameters comprises coefficients for the adaptive filter, or is for use to obtain coefficients for the adaptive filter;

wherein the feedback suppressor circuit is further configured for clustering some of the feedback model parameters to obtain a plurality of clusters; and wherein the audio system is a hearing aid or a communication system.

11. The audio system according to claim 10, wherein the feedback suppressor circuit is further configured for selecting one of the clusters corresponding to a detected sound environment for modelling of the feedback signal path.

12. The audio system according to claim 11, wherein the feedback suppressor circuit is configured for modelling the feedback signal path based on feedback model parameters of a centre of the selected one of the clusters.

13. The audio system according to claim 10, wherein the feedback suppressor circuit is further configured for merging two of the clusters when their mutual similarity distance is less than a threshold value.

14. The audio system according to claim 13, wherein the threshold value is a function of a similarity distance between current feedback model parameters determined by the feedback suppressor circuit and their nearest cluster centre.

15. The audio system according to claim 13, wherein the threshold value is a function of a dissimilarity between two of the clusters that are most similar.

16. The audio system according to claim 13, wherein the threshold value is a function of deviations within the clusters.

17. The audio system according to claim 10, wherein the feedback suppressor circuit is further configured for deleting one of the clusters when its membership count is below a threshold value.

18. The audio system according to claim 10, wherein the feedback suppressor circuit is further configured for creating a new cluster when a similarity distance to a nearest cluster is larger than a threshold value.

19. The audio system according to claim 10, wherein the feedback suppressor circuit is further configured for splitting one of the clusters when a similarity distance within the one of the clusters is larger than a threshold value.

20. The audio system according to claim 10, wherein the feedback suppressor circuit is further configured to maintain one of the clusters unchanged when it has been used effectively for a certain period of time.

21. The audio system according to claim 10, wherein the feedback suppressor circuit is further configured for identifying a smallest cluster with a lowest membership count, and replacing that cluster with current feedback model parameters determined by the feedback suppressor circuit, provided that the lowest membership count is below a threshold value and that a similarity distance from the smallest cluster to its nearest cluster is larger than a similarity threshold value.

22. The audio system according to claim 10, wherein the feedback suppressor circuit is further configured for maintaining a statistical model of the feedback path in a form of a Gaussian mixture model.

23. The audio system according to claim 22, wherein the feedback suppressor circuit is further configured to share statistical information between the cluster and another cluster.

24. The audio system according to claim 10, wherein the feedback suppressor circuit is configured to use the cluster to detect speech.

25. The audio system according to claim 10, further comprising a log for recording the clusters and selected feedback model statistics.

26. The audio system according to claim 25, wherein the log is also for recording performance of the feedback suppressor circuit.

27. The audio system according to claim 25, where the log is also for recording encountered signal model statistics.

28. The audio system according to claim 10, wherein the feedback suppressor circuit is configured to select one of the clusters, and wherein the selected cluster is used to detect when the audio system is put in, taken out, or placed incorrectly to a ear or a user.

29. An audio system comprising:

a signal processor for processing an audio signal, and a feedback suppressor circuit configured for modelling a feedback signal path of the audio system by provision of a feedback compensation signal based on a cluster of feedback model parameters for the feedback signal path that are stored in a repository;

wherein the feedback suppressor circuit comprises an adaptive filter for modelling the feedback path, and wherein the cluster of the feedback model parameters stored in the repository comprise filter coefficients of the adaptive filter;

wherein the audio system further comprises a switch that is configured for switching an input to the signal processor between an output of a first subtractor and an output of a second subtractor for subtracting an output signal of the adaptive filter from the audio signal; and wherein the audio system hearing aid or a communication system.

30. An audio system comprising:

a signal processor for processing an audio signal, and a feedback suppressor circuit configured for modelling a feedback signal path of the audio system by provision of a feedback compensation signal based on a cluster of feedback model parameters for the feedback signal path that are stored in a repository;

wherein the feedback suppressor circuit comprises an adaptive filter for modelling the feedback path, and wherein the cluster of the feedback model parameters stored in the repository comprise filter coefficients of the adaptive filter;

wherein the feedback suppressor circuit is further configured for constrained updating the filter coefficients of the adaptive filter; and wherein the audio system is a hearing aid or a communication system.

31. An audio system comprising:

a signal processor for processing an audio signal, and a feedback suppressor circuit configured for modelling a feedback signal path of the audio system by provision of a feedback compensation signal based on a cluster of feedback model parameters for the feedback signal path that are stored in a repository;

wherein the feedback suppressor circuit comprises an adaptive filter for modelling the feedback path, and wherein the cluster of the feedback model parameters stored in the repository comprise filter coefficients of the adaptive filter;

wherein the feedback suppressor circuit is configured for updating the filter coefficients of the adaptive filter by applying a de-correlation; and wherein the audio system is a hearing aid or a communication system.

32. The audio system according to claim 31, wherein the feedback suppressor circuit is configured to apply the de-correlation to an error signal.

33. The audio system according to claim 31, further comprising a fixed filter for the de-correlation.

34. An audio system comprising:

a signal processor for processing an audio signal, and a feedback suppressor circuit comprising an adaptive filter and configured for modelling a feedback signal path of the audio system by provision of a feedback compensation signal based on a cluster of feedback model parameters for the feedback signal path that are stored in a repository, wherein at least a subset of the feedback model parameters comprises coefficients for the adaptive filter, or is for use to obtain the coefficients for the adaptive filter;

wherein the audio system is configured to apply an adaptive non-linear de-correlation in the signal path; and wherein the audio system is a hearing aid or a communication system.

35. The audio system according to claim 34, wherein the audio system is configured to apply the adaptive non-linear de-correlation.

36. An audio system comprising:

a signal processor for processing an audio signal, and a feedback suppressor circuit comprising an adaptive filter and configured for modelling a feedback signal path of the audio system by provision of a feedback compensation signal based on a cluster of feedback model parameters for the feedback signal path that are stored in a repository, wherein at least a subset of the feedback model parameters comprises coefficients for the adaptive filter, or is for use to obtain the coefficients for the adaptive filter;

wherein the feedback suppressor circuit is further configured for maintaining a statistical model of an external signal to distinguish correlations between an output of the audio system and an input caused by feedback from correlations already present in the external signal; and wherein the audio system is a hearing aid or a communication system.

37. An audio system comprising:

a signal processor for processing an audio signal, and a feedback suppressor circuit comprising an adaptive filter and configured for modelling a feedback signal path of the audio system by provision of a feedback compensation signal based on a cluster of feedback model parameters for the feedback signal path that are stored in a repository, wherein at least a subset of the feedback model parameters comprises coefficients for the adaptive filter, or is for use to obtain the coefficients for the adaptive filter;

wherein the feedback suppressor circuit is further configured for maintaining the cluster of the feedback model parameters for the feedback path and a clustering model of an external signal; and wherein the audio system is a hearing aid or a communication system.

38. An audio system comprising:

a signal processor for processing an audio signal, and a feedback suppressor circuit comprising an adaptive filter and configured for modelling a feedback signal path of the audio system by provision of a feedback compensation signal based on a cluster of feedback model parameters for the feedback signal path that are stored in a repository, wherein at least a subset of the feedback model parameters comprises coefficients for the adaptive filter or is obtain the coefficients for the adaptive filter;

wherein the feedback suppressor circuit is further configured to operate on multiple input signals independently;

wherein the feedback suppressor circuit is further configured to share information between the multiple input signals; and wherein the audio system is a hearing aid or a communication system.

39. An audio system comprising:

a signal processor for processing an audio signal, and a feedback suppressor circuit comprising an adaptive filter and configured for modelling a feedback signal path of the audio system by provision of a feedback compensation signal based on a cluster of feedback model parameters for the feedback signal path that are stored in a repository, wherein at least a subset of the feedback model parameters comprises coefficients for the adaptive filter, or is for use to obtain the coefficients for the adaptive filter;

wherein the feedback suppressor circuit is further configured to operate on multiple input signals independently;

wherein the feedback suppressor circuit is further configured to use a shared signal model for the input signals; and wherein the audio system is a hearing aid or a communication system.

40. An audio system comprising:

a signal processor for processing an audio signal, and a feedback suppressor circuit comprising an adaptive filter and configured for modelling a feedback signal path of the audio system by provision of a feedback compensation signal based on a cluster of feedback model parameters for the feedback signal path that are stored in a repository, wherein at least a subset of the feedback model parameters comprises coefficients for the adaptive filter, or is for use to obtain the coefficients for the adaptive filter;

wherein the feedback suppressor circuit is further configured to operate on multiple input signals independently;

wherein the feedback suppressor circuit is further configured with clustering models that combine feedback paths of all or some of the multiple input signals; and wherein the audio system is a hearing aid or a communication system.

41. An audio system comprising:

a signal processor for processing an audio signal, and a feedback suppressor circuit comprising an adaptive filter and configured for modelling a feedback signal path of the audio system by provision of a feedback compensation signal based on a cluster of feedback model parameters for the feedback signal path that are stored in a repository, wherein at least a subset of the feedback model parameters comprises coefficients for the adaptive filter, or is for use to obtain the coefficients for the adaptive filter;

wherein the feedback suppressor circuit is configured to take into account higher order statistics to characterize receiver, amplifier, and/or microphone non-linearities in the feedback path; and wherein the audio system is a hearing aid or a communication system.

42. An audio system comprising:

a signal processor for processing an audio signal, and a feedback suppressor circuit comprising an adaptive filter and configured for modelling a feedback signal path of the audio system by provision of a feedback compensation signal based on a cluster of feedback model parameters for the feedback signal path that are stored in a repository, wherein at least a subset of the feedback model parameters comprises coefficients for the adaptive filter, or is for use to obtain the coefficients for the adaptive filter;

wherein the feedback suppressor circuit of the audio system is configured to use a selected feedback model to detect a presence of a reflection from a phone; and wherein the audio system is a hearing aid or a communication system.

43. An audio system comprising:

a signal processor for processing an audio signal, and a feedback suppressor circuit comprising an adaptive filter and configured for modelling a feedback signal path of the audio system by provision of a feedback compensation signal based on a cluster of feedback model parameters for the feedback signal path that are stored in a repository, wherein at least a subset of the feedback model parameters comprises coefficients for the adaptive filter, or is for use to obtain the coefficients for the adaptive filter;

wherein the feedback suppressor circuit of the audio system is configured to use a current signal model to detect a use of a phone; and wherein the audio system is a hearing aid or a communication system.

* * * * *